(No Model.)
B. A. BLAKEMORE.
MARKING DEVICE FOR PHOTOGRAPHIC NEGATIVES.
No. 456,396. Patented July 21, 1891.
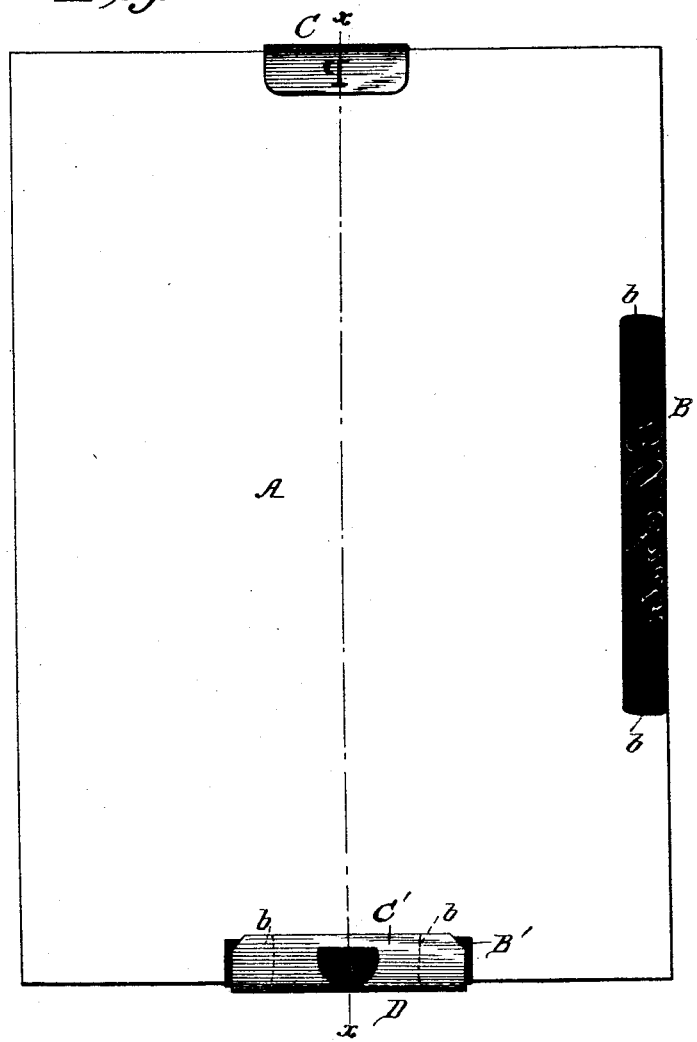 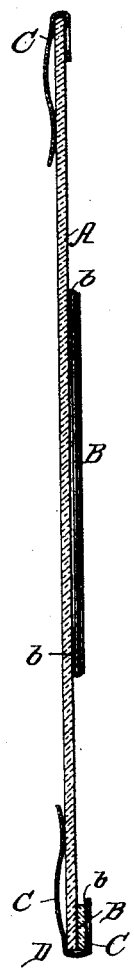
WITNESSES:
Fred G. Dieterich
Edw. W. Byrn
INVENTOR:
Benjamin A. Blakemore
BY Munn & Co.
ATTORNEYS

UNITED STATES PATENT OFFICE.

BENJAMIN A. BLAKEMORE, OF STAUNTON, VIRGINIA.

MARKING DEVICE FOR PHOTOGRAPHIC NEGATIVES.

SPECIFICATION forming part of Letters Patent No. 456,396, dated July 21, 1891.

Application filed October 21, 1890. Serial No. 368,869. (No model.)

*To all whom it may concern:*

Be it known that I, BENJAMIN A. BLAKEMORE, of Staunton, in the county of Augusta and State of Virginia, have invented a new and useful Improvement in Marking Devices for Photographic Negatives, of which the following is a specification.

The object of my invention is to enable photographers to number or otherwise distinctively mark their negatives as they take them, and thus avoid the confusion and uncertainty in identifying the negative afterward. The advantage of this may be better understood when it is remembered that the photographer seldom develops while the customer is in, and the interval which elapses between the sitting and development is liable to cause great confusion in negatives.

My invention consists in a stencil-plate bearing a distinctive number, letter, name, or other marking, which is applied to the sensitized plate, and which stencil causes said mark to be photographed on the plate simultaneously with the exposure for the sitting, as hereinafter fully described.

Figure 1 is a face or front view of a sensitized photographic plate having different forms of stencils applied thereto, and Fig. 2 is a section of the same through line $xx$.

In the drawings, A represents the sensitized plate, to the film side of which at the edges are applied three different forms of my stencil, as at B C D.

B is the simplest form. This consists simply of a strip of coated glass, upon the film or coated side of which is scratched by a sharp instrument the designating name, number, or letter, which latter is transparent, while the rest of the glass is opaque. This glass stencil is merely stuck on the edge of the negative by a small quantity of wax and varnish $b$ at each end, which is put upon the stencil, and when the latter is pressed against the plate causes the stencil to firmly cling thereto. When the photograph is taken, it will be seen that the stencil causes the name, number, or letter forming the distinctive mark to be simultaneously photographed on the negative, and the book or register of the photographer being marked to correspond it will be seen that the negative is by this means completely identified.

Instead of a glass stencil stuck on, I may make the stencil of metal, as at C, bent around the back of the plate, so as to form a spring-clasp that clamps the edge of the plate, or I may combine the two forms shown at B and C, as shown at D. In this case the spring-clasp holds the glass stencil to the plate.

I am aware of the patent to J. Brown, dated November 15, 1853, for a frame, through which a view of the sitter is obtained in taking daguerreotypes, which frame had a detachable name-plate.

I do not claim any such device, and limit my invention to a stencil applied to and combined with the sensitized plate or negative of a photographic apparatus, which is designed entirely for the use of the operator and not of the sitter.

Having thus described my invention, what I claim as new is—

1. The combination, with a photographic negative or sensitized plate, of a removable or detachable stencil applied to the same near the edge to distinctively mark the plate simultaneously with the taking of the picture, substantially as shown and described.

2. A stencil for photographic plates, consisting of a strip of glass having an opaque coating and bits of wax or plastic material at the end to cause it to adhere to the plate, substantially as shown and described.

BENJAMIN A. BLAKEMORE.

Witnesses:
WM. P. RHODES,
WM. A. JESSER.